United States Patent Office 3,414,463
Patented Dec. 3, 1968

3,414,463
ORGANOPOLYSILOXANE MODIFIED WITH AN ORGANOPHOSPHORUS COMPOUND AND USE THEREOF
Amy L. Jasinski, Reston, Va., assignor to Owens-Illinois, Inc., a corporation of Ohio
No Drawing. Continuation-in-part of application Ser. No. 418,549, Dec. 15, 1964. This application Jan. 4, 1968, Ser. No. 695,551
20 Claims. (Cl. 161—191)

ABSTRACT OF THE DISCLOSURE

A method for incorporating an organophosphorus compound into an organopolysiloxane composition and the products produced therefrom. The organophosphorus modified organopolysiloxane composition is useful in laminating and adhesive applications.

This application is a continuation-in-part of copending application Ser. No. 418,549 filed Dec. 15, 1964, now abandoned, which application is assigned to the corporate predecessor of the assignee of the present application.

THE INVENTION

This invention relates broadly to compositions comprising a modified organopolysiloxane. More particularly it relates to organopolysiloxanes having incorporated therein, as by chemical combination, at least one organophosphorus compound of a particular type or kind. The scope of the invention also includes composite or laminated articles embodying the aforementioned organopolysiloxane compositions as well as method features.

The organophosphorus compounds that I have found to be useful in improving physical properties, especially adhesiveness and, also, thermal shock resistance, of a certain class of organopolysiloxanes comprise at least one member of the group consisting of organic tertiary phosphates, organic tertiary phosphites and organic phosphonates. The aforementioned organopolysiloxane comprises the siloxane condensation product of the hydrolysis product of hydrolyzable silane including at least one substance represented by the general formula I            $T_nSiZ_{(4-n)}$ wherein T is a member of the group consisting of methyl and a mixture of methyl and phenyl, each Z independently represents a hydrolyzable alkoxy group in which the alkoxy group has less than 7 carbon atoms and $n$ is 1, and said organophosphorus compound being incorporated into the incompletely condensed organopolysiloxane in an amount sufficient to improve the physical properties, especially adhesiveness, of the completely condensed organopolysiloxane.

It will be understood, of course, by those skilled in the art that some or all of the Z's in Formula I can also represent an —OH group. Hence the term "hydrolyzable" as used herein and in the appended claims is intended to include within its meaning compounds wherein the hydrolyzable group or groups have already been hydrolyzed to an —OH group or groups, unless it is clear from the context that the more limited meaning is intended. The terms "hydrolysis" product and "condensation" product as used in the preceding paragraphs and elsewhere in this specification, and in the appended claims, are intended to include within their meaning the co-hydrolysis and co-condensation products that result when mixtures of silicon-containing starting reactants are employed.

The present invention is an improvement in the organopolysiloxane compositions disclosed and claimed in Burzynski and Martin copending applications Ser. No. 306,344, now abandoned in favor of continuation-in-part application Ser. No. 520,893, which application is now abandoned in favor of continuation-in-part application Ser. No. 676,081; and Ser. No. 370,684, which application is now abandoned in favor of application Ser. No. 660,223, including method features. All of these applications are assigned to the corporate predecessor or the same assignee as the instant invention, and by this cross-reference are made a part of the disclosure of the present invention. For purpose of brevity, the aforementioned abandoned parent applications will sometimes be referred to hereinafter as the 344 and 684 applications.

For certain uses the solid, thermoset or cured organopolysiloxanes as described in the aforementioned 344 and 684 applications do not have the optimum physical properties, e.g., optimum resistance to thermal shock or optimum adhesiveness (especially in the case of adhesive, coating, laminating, encapsulating and similar compositions) necessary to meet the requirements of the particular service application. Also, in some cases, it is desirable to internally plasticize the organopolysiloxane thereby to obtain, for example, a tougher resin of decreased hardness.

The present invention is based on the discovery that the aforementioned and other physical properties of the organopolysiloxanes of the −344 and −684 applications can be improved in such properties as mentioned in the preceding paragraph by incorporating therein an organophosphorus compound of the kind defined in the second paragraph of this specification, more particularly such a compound wherein the organic substituent, e.g., a hydrocarbon grouping, contains less than 7 carbon atoms. The chosen organophosphorus compounds are those which have a minimum effect on the acidity of the reaction mass during and after introduction of the organophosphorus compound into the organopolysiloxane thereby to avoid premature gelation or cross-linking of the modified organopolysiloxane.

The organophosphorus compounds employed in practicing this invention are those represented by the following general formulas:

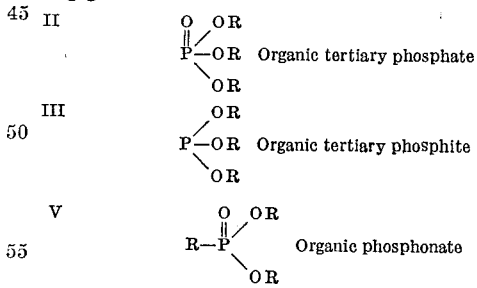

R in each of the above formulas represents an organic grouping, preferably a hydrocarbon radical. Other organophosphorus compounds are not the full equivalents of those embraced by Formulas II, III and IV such as those which contain one or more H atoms or one or more —OH groups attached directly to P.

It is a primary object of the present invention to provide new and useful modified organo-silicon compounds and, more particularly, modified organopolysiloxanes.

It is a further object of the instant invention to provide modified organopolysiloxanes having improved physical properties, such as improved adhesiveness and resistance to thermal shock, as compared with unmodified organopolysiloxanes which are otherwise the same.

Still another object of the invention is to provide composite articles, and particularly laminated products, comprising laminae bonded together with an adhesive composition comprising a modified organopolysiloxane. The laminae advantageously are those constituted of inorganic material including, for example, glass in sheet or other form.

Another object of the invention is to provide a method of preparing the aforementioned modified organopolysiloxanes.

Still other objects of the invention will be apparent to those skilled in the art from the following more detailed description and from the appended claims.

The foregoing objects of the invention are attained by producing a phosphorus-modified organopolysiloxane as described briefly hereinbefore and more fully hereafter.

In accordance with one embodiment of the present invention there is first prepared an organopolysiloxane comprising or consisting essentially of the siloxane condensation product of hydrolyzable silane including at least one compound embraced by Formula I.

Illustrative examples of groups represented by Z in Formula I include, for example, alkoxy (e.g., methoxy through heptoxy). Alkoxy groups are preferred because their hydrolysis products are less acidic, and therefore control of the rate of siloxane condensation is simplier. Alkoxy groups of less than 5 carbon atoms are especially advantageous (and are preferred) for the radical represented by Z in Formula I, because the rate of hydrolysis can be inconveniently slow when the organic hydrolyzable radical(s) have a higher molecular weight (i.e., more carbon atoms).

Illustrative examples of radicals represented by T in Formula I are methyltrialkoxysilanes such as methyltriethoxysilane and mixtures of methyltrialkoxysilanes and phenyltrialkoxysilanes.

More specific examples of compounds embraced by Formula I are given hereinafter with respect to compounds within the scope of Formulas V and VI given later herein.

Monomeric starting materials of the formula $T_nSiZ_{(4-n)}$ can be prepared by a variety of procedures known to the art.

The means selected to effect hydrolysis of the starting materials and condensation of the resultant silanols is dependent primarily upon the physical characteristics desired in the product. When liquids or films are to be prepared, hydrolysis and condensation can be carried out simply by contacting the monomer or mixture of monomers with water. Usually, however, one or more conditions designed to increase speed or homogeneity of reaction, such as stirring, elevated temperatures, addition of acid, use of an added solvent, are used. Viscosity of the final product can be regulated by controlling the time of reaction, use of catalysts, concentration of reactants, rate of evaporation, and similar variables. The particular manner in which control of these variables will be attained will depend on the particular circumstances, and can be determined by routine experimentation according to procedures generally well known to those skilled in the art.

PREPARATION OF UNMODIFIED ORGANOPOLYSILOXANES

In general, the preparation of the unmodified organopolysiloxane comprises heating a hydrolyzable silane including at least one compound embraced by Formula I with from 1.5 to 10 moles of water for each mole of the total molar amount of the hydrolyzable silane(s). Heating is continued for at least one hour and up to about 10 hours or more at a temperature of at least about 50° C. while retaining at least about 1.5 moles of hydroxy-containing by-products in the reaction mass per mole of silicon-containing starting material, assuming complete hydrolysis of all the hydroxyhydrocarbyl-silicon linkages in the said reaction mass. Thereafter the temperature of the reaction mass is gradually raised to a final temperature of from about 100° C. to about 300° C. while gradually removing by volatilization the volatile by-products, e.g., alkanol and some water. This occurs over a time interval of at least 5 minutes. Thereafter, condensation and heating are continued in the aforesaid temperature range of from 100°–300° C. for a period short of gel or solid formation within the said temperature range.

Suitable experimentally-determined variations of the time and temperature parameters of the process involved in making the organopolysiloxanes would probably allow use of, for example, alkoxysilanes containing a higher number of carbon atoms in an alkoxy chain. However, in general, the longer hydrolysis time required by alkoxy radicals of longer chain-lentgh makes them, ordinarily, undesirable for use.

As has been indicated hereinbefore, the concentration of water in the initial hydrolysis-condensation reaction mixture advantageously is at least about 1.5 moles, more particularly from about 1.5 moles to about 10 moles of water, per mole of the total amount of hydrolyzable silane reactants(s). Organopolysiloxane resins can be prepared at the aforementioned lower concentration of water, but further decrease in the water content of the reaction mass ordinarily leads to the production of polymers that are rubbery and soft, presumably due to incomplete hydrolysis whereby residual alkoxy groups are left in the partial condensation products. If the quantity of water is in the range of from about 1.5 moles to about 5 moles of water per mole of the hydrolyzable silane(s), the hydroxy-containing by-products, e.g., alkanols, formed during hydrolysis, act as a solvent for the other products and reactants, as a result of which the initially heterogeneous reaction mass becomes clear and homogeneous. This homogeneity allows more uniform control of resin formation.

If the ratio of water to hydrolyzable silane(s) substantially exceeds 5:1, the resulting amount of by-product hydrolysis products, such as alkanols, is insufficient to convert the aqueous medium to a solvent for the reactants and the reaction products, and resin precipitation can occur. Insolubility of resinous products at higher water concentrations can be overcome by adding a water-miscible organic solvent, e.g., ethanol, isopropanol, or any other organic solvent for the polymer having water-miscibility characteristics. However, at water-concentrations above about 10 moles of water per mole of hydrolyzale silicon-containing monomer, gel formation may occur even if sufficient organic solvent is added to make the reaction mass homogeneous. The exact upper limit of the ratio of water to hydrolyzable silicon-containing monomeric material is dependent upon such influencing factors as, for example, the particular hydrolyzable silicon-containing material employed, the pH and temperature of the reaction mass, time of reaction, etc. Hence the upper limit cannot be set forth precisely, but can be determined by routine test in each case. The limits within which no addition of organic solvent is required, viz., from about 1.5 moles to about 5.0 moles of water per mole of hydrolyzable silicon-containing monomer, are preferred.

At presures near one atmosphere, temperatures in the range of from about 50° C. to the reflux temperature of the reaction mass are useful. Temperatures much below this range require substantially longer times for reaction, and thus obviate a particularly advantageous aspect of the resin-making process, namely, its relatively high speed of operation. Also, no particular improvement in properties is attained by the use of such lower temperatures. In general, temperatures at or near the reflux temperature of the reaction mass are preferred, especially when refluxing occurs at from about 70° C. to about 90° C. Under the concentration and temperature conditions hereinbefore described, the initial hydrolysis and condensation are complete in from about 1 to about 10 hours, depending upon the particular materials and conditions used, and generally within from about 2 to 3 hours.

It is preferred that some of the hydrolysis by-products, such as alkanols, be retained in the reaction mass during the initial hydrolysis and condensation. It is believed that the presence of such hydroxy-containing by-products slows, by mass action, the overall rate of hydrolysis and thus, indirectly, condensation. This control of the rate of resin formation prevents gel formation and makes possible the preparation of homogeneous, phosphorus-modified, highly cross-linked polymers having good dimensional stability. If the concentration of hydrolysis by-products is allowed to fall substantially below 1.5 moles thereof per mole of the hydrolyzable silicon-containing monomeric material (assuming that complete hydrolysis and condensation to an organo-polysiloxane of the formula $(RSiO_{1.5})_n$, where $n$ represents a number corresponding to the degree of polymerization and is greater than 1, takes place), gel formation occurs. This limit can vary slightly with the particular materials and conditions employed.

After initial hydrolysis and condensation under the conditions just described, and after controlled volatilization of the hydrolysis by-products, e.g., alkanols and water, is effected, the reaction mass is heated to from about 100° C. to about 300° C., which is herein designated as the "precure" step.

The purpose of precure is to effect controlled removal of the remaining volatiles while the siloxane condensation reaction continues at a convenient rate, but which is nevertheless slowly enough to avoid gel formation. Depending upon the end use, the highest possible precure temperature is generally preferred, since this provides greatest impetus to siloxane formation and volatilization of the hydrolysis by-products, and makes possible the shortest time required to effect final cure at a lower temperature.

The temperature to which a particular reaction mass can be heated during precure without causing gelation thereof depends, for example, upon the particular materials used and their prior treatment, but the limit can be readily established by heating an aliquot to gelation and keeping the precure temperature of the main batch slightly below this gelation point. The precure time is similarly dependent upon several variables. At a precure temperature above 100° C. it is, in general, at least about 5 minutes, although the time at the highest temperatures attained can be merely momentary.

To avoid gelation and to effect polysiloxane formation at a conveniently rapid rate, the acidity of the initial hydrolysis-condensation reaction mass advantageously is maintained within certain limits hereafter set forth in detail. Commercial hydrolyzable silicon-containing compounds (silanes) of the kind embraced by Formula I, such as commercial alkoxysilanes, usually contain a quantity of acid or base that exceeds the relatively narrow limits permissible in the initial reaction mixture employed in practicing a preferred embodiment of the instant invention. Impure monomers can be used in the hydrolysis reaction mixture, followed by addition of acid or base to adjust the pH to the required level. However, the large amount of salts that are formed impair desirable properties, especially transparency, of the final products. Salts, particularly those of variable-valence cations, may also act as catalysts for siloxane formation. It is, therefore, preferable to adjust the pH of the monomer or mixture of monomers before preparing the reaction mixture. Simple distillation is unsuitable because it increases the acidity of the monomeric material, probably by oxidation of some organic groups to acidic or potentially acidic functions such as carboxylic acids, esters, aldehydes and/or ketones. Use of a nitrogen atmosphere is insufficient to prevent this acidity increase, apparently because the system itself contains oxidizing species. Reduction of acid content can be carried out by adding bases such as metal hydroxides or amines, but the salts that are formed are objectionable impurities in the final products.

A preferred technique for preparing the monomeric material is by distillation of an admixture of the monomer with a reagent that will convert acidic species therein to non-volatile compounds, for instance as disclosed in the aforementioned application of Burzynski and Martin, Ser. No. 370,684.

Initial hydrolysis-condensation is conveniently carried out by charging to a reaction vessel pure water, a hydrolyzable silane of the kind embraced by Formula I, and preferably also a small amount of an acidic catalyst. The initially cloudy reaction mixture clears on heating, usually within an hour, because the hydroxyhydrocarbon by-product, specifically alcohol, dissolves the other components of the mixture. A suitable degree of hydrolysis-condensation is usually obtained if reflux is allowed to proceed for from about 1 to 4 hours after the mixture clears. This step can be carried out at lower temperatures, but the rate is substantially slower.

The upper limit of permissible acid content during this initial hydrolysis-condensation is that beyond which gel formation occurs. The lower limit is determined by the desired reaction time. In general, the minimum reaction time to obtain satisfactory products is usually about 1 hour under reflux. Maximum and minimum allowable acid contents vary with the ratio of hydrolyzable silane(s) and water used. The lower theoretical water content is $Z/2$, where $Z$ is the average number of hydrolyzable groups attached to silicon throughout the reaction mass. Thus when the hydrolyzable silane is, for example, a methyltrialkoxysilane as the sole silane constituent, the theoretical lower molar ratio of hydrolyzable silane:water is 1:1.5. At this molar ratio, the acid content is generally controlled within the range of from about 50 to about 650 parts (or higher in some cases) of HCl per million parts of hydrolyzable silane. When the hydrolyzable silane:water molar ratio is 1:3.0, the minimum acid content is about 1 part of HCl per million parts of the hydrolyzable silane and the maximum is about 10 parts on the same basis.

The aforementioned limits are necessarily subject to minor variations in each case. First, polymer formation may not proceed identically in any two runs, and the acid sensitivity of the system may vary. Second, use of other hydrolyzable silanes in certain amounts of co-monomers can reduce acid sensitivity, but the effect will generally be small. Third, extremely small quantities of impurities in a given sample, impractical to remove, can alter acid sensitivity slightly. These factors, however, affect only the maximal and minimal extremes of acid content, and the major portion of the suitable area indicated will be unchanged.

It is usually most convenient to reduce the acid content of the monomer(s) to about zero part by weight of HCl per million parts of monomer(s) by suitable acid-removal technique and, if necessary, then adjust the acidity of the initial reaction mixture by adding acid to the water used. Although generally any acidic material soluble in the reaction mass can be used, organic acids such as phenol and formic acid are particularly suitable because they retard subsequent oxidation of the reactants.

The reaction mass obtained from the initial hydrolysis-condensation reaction is concentrated by removing volatile components, conveniently by distillation from the vessel containing the said mass. All of the solvents should not be removed or the resin will have a pronounced tendency to gel. Usually, removal of about 80 mole percent of the hydroxyhydrocarbon by-product, e.g., an alkanol, gives a residue convenient to manipulate further by the particular means herein described. The concentrate thus obtained is next heated to a temperature above the boiling point of pure water at the prevailing pressure for a specified time, conveniently while stirring in an open vessel. The time and temperature of this precure step are determined by the particular composition used, but in general a temperature of 110° to 300° C. at ambient pressure and a period up to about 30 minutes are typical. The elimination of water and other volatile materials from the reaction mass at this point presumably leads to further linear polymerization and cross-linking, and the mass becomes increasingly viscous.

If the precure step is omitted from the process, the resins cast from the liquid, phosphorus-modified organopolysiloxane crack severely during the final curing step. Such cracked resins can be pulverized, e.g., to 300-mesh particle size and finer, and the finely divided resin used as a filler in paints and molding compositions (e.g., urea- and melamine-formaldehyde resins, methyl methacrylate and other acrylate polymers, polystyrene, etc.), and in making other filled compositions and articles from any of the available unfilled or partly filled natural resins, thermoplastic and thermosetting resins and plastics, and the like.

PRODUCTION OF SOLID, MACHINABLE RESINS OR STRUCTURES

As has been indicated hereinbefore, the present invention can be practiced by modifying the solid, machinable, thermosetting (or thermoset) organopolysiloxane resins or structures disclosed and claimed in the aforementioned application Ser. Nos. 306,344 and 370,684.

The invention of Burzynski et al. application Ser. No. 370,684 is directed to a method of preparing a solid resin by (a) heating reactant(s) consisting of a methyltrialkoxysilane of the formula V 

and 0 to 10 mole percent, preferably not more than 5 mole percent, based on total silane reactant(s), of at least one compound of the formula VI 

wherein each T independently represents a monovalent radical selected from the group consisting of aryl, alkyl (including cycloalkyl), and alkenyl radicals, each of which contains less than 7 carbon atoms, and the alkoxy radical, RO—, wherein R represents an alkyl radical of less than 4 carbon atoms, and from 1.5 to 10 moles of water per mole of silane, for at least one hour and up to 10 hours at temperatures of at least 50° C. while retaining at least 1.5 moles of alkanol by-products in said mixture per mole of silane starting material assuming complete hydrolysis of all alkoxy-silicon linkages in the silane reactant material in the said mixture, and (b) gradually raising the temperature of the resulting mixture to a final temperature of from 100° to 300° C. while gradually removing by volatilization alkanol by-products and some water, over a time interval of at least 5 minutes, and continuing condensation and heating in the range of 100° to 300° C. for a time short of solid or gel formation in said temperature range.

Methyltrialkoxysilanes used in practicing the invention of the aforementioned Ser. No. 370,684 are those of the formula $CH_3Si(OR)_3$ where each R represents an alkyl radical with less than 4 (i.e., 1 to 3) carbon atoms. Included are methyltrimethoxysilane,
methyltriethoxysilane,
methyltri-n-propoxysilane, and
methyltriisopropoxysilane, as well as compounds with mixed alkoxy groups. Examples of co-reactants embraced by Formula VI include trimethylmethoxysilane,
tri(1-methylethyl)ethoxysilane,
di(1-methylpropyl)diethoxysilane,
divinyldipropoxysilane,
diphenyldiethoxysilane,
propylpentylmethoxyethoxysilane,
methylallyldi(1-methylethoxy)silane,
vinylphenyldimethoxysilane,
ethyltriethoxysilane,
(1-methylethyl)trimethoxysilane,
(1,1-dimethylethyl)tripropoxysilane,
hexyltriethoxysilane, and
vinyltriethoxysilane.

Comonomers embraced by Formula VI, if employed, can be used to modify the properties of the resins according to principles known generally to the art. Thus, comonomers containing 3 or 4 alkoxy groups act as cross-linking agents; those with 2 alkoxy groups act to increase chain length and decrease cross-linking; and those with one alkoxy group act as chain-terminating agents. In particular, inclusion of dialkoxysilanes such as dimethyldiethoxysilane can be used to diminish cross-linking and thus provide less brittle products. Inclusion of more than about 5 mole percent of alkyl orthosilicates can lead to excessive cross-linking and attendant brittleness, and quantities of other comonomers substantially above this amount may cause decreased chemical resistance.

In this embodiment, too, the concentration of water in the initial hydrolysis-condensation reaction mixture should be in the range of from about 1.5 moles to about 10 moles of water per mole of silane reactants. Likewise, the other remarks made hereinbefore with respect to resin precipitation and avoidance thereof apply to the production of a solid, machinable polysiloxane, as do also the remarks made with regard to the temperature and pressure of the reaction, and the retention of hydrolysis products (e.g., an alkanol) in the reaction mass during hydrolysis and initial condensation.

Initial hydrolysis-condensation is conveniently carried out by placing in a flask pure water, methyltrialkoxysilane, the acid content of which has been suitably adjusted, and from 0 to 10 mole percent, preferably not more than 5 mole percent, based on the total hydrolyzable silanes, of a compound of the kind embraced by Formula VI. If so desired or deemed necessary, these compounds may be purified. The resulting mixture is then heated under reflux conditions.

The initially cloudy reaction mixture clears on heating, usually within an hour, because the hydroxyhydrocarbon by-product, specifically alcohol, dissolves the other components of the mixture. As previously has been stated, a suitable degree of hydrolysis-condensation is usually obtained if reflux is allowed to proceed for from about 1 to 4 hours after the mixture clears.

Other conditions with respect to the permissible acid content during the initial hydrolysis-concentration step, and concerning other influencing variables have been given hereinbefore.

In making methylpolysiloxanes referred to above, as well as, for instance, (methyl)(phenyl)polysiloxanes, some alkanol or other hydrolysis by-product should be retained, as previously indicated, in the reaction mass during hydrolysis and initial condensation for the reasons previously given. To avoid gelation and effect polysiloxane formation at a conveniently rapid rate, the acidity of the initial hydrolysis-condensation reaction mixture advantageously is suitably controlled. After initial hydrolysis and condensation controlled volatilization of hydrolysis by-products and water is effected, while the temperature of the mixture is raised to temperatures in the range of 100° to 300° C., thereby to precure the resin in the manner and for the reasons previously stated.

OTHER TECHNIQUE FOR PREPARING AN ORGANOPOLYSILOXANE WHICH IS MODIFIED WITH AN ORGANOPHOSPHORUS COMPOUND

Other technique, including both composition and method features, for preparing an organopolysiloxane that advantageously can be modified with an organophosphorus compound in accordance with the present invention is described in the aforementioned Burzynski and Martin application Ser. No. 306,344. In the invention of this Burzynski et al. application, a mixture which comprises a precursor hydrolyzable to methylsilanetriol, a precursor hydrolyzable to phenylsilanetriol, and water is heated; the reaction mixture is concentrated by removing a substantial portion but not all of the volatile components; heated above the boiling point of pure water at the prevailing pressure; and formed and heated at a temperature below the boiling point of pure water at the prevailing pressure to provide a cured, machinable, heat-resistant organopolysiloxane body.

In the procedure of the invention of the −344 application usually a mixture which comprises a hydrolyzable methyltrialkoxysilane, a hydrolyzable phenyltrialkoxysilane, and water in a relative molar ratio of $x:y$: at least $1.5(x+y)$, respectively, wherein $x$ and $y$ are independently selected from the range of 1 to 10, inclusive, is heated at a temperature between ambient temperature and reflux temperature for a time of 1 to 10 hours; 50 to 90 mole percent of the alkanol by-product is removed by volatilization, the organophosphorus compound advantageously being added before or during the removal of this mole percent of alkanol by-product; the reaction mixture is heated to effect precure at a temperature within the range of up to 100 centigrade degrees above the boiling point of pure water at the prevailing pressure for a time up to 30 minutes; and the resinous mixture thus obtained is formed, usually by casting, and then cured for a time of at least 1 hour and up to 30 days at a temperature of from 1 centigrade degree to 90 centigrade degrees below the boiling point of pure water at the prevailing pressure to give a cured or hardened, machinable, heat-resistant organopolysiloxane body.

The methyltrialkoxysilanes and phenyltrialkoxysilanes cited in the preceding paragraph refer to compounds of the formulas $CH_3Si(OR)_3$ and $C_6H_5Si(OR)_3$, wherein R represents a monovalent alkyl radical of less than five (i.e., 1–4) carbon atoms. Examples of such methyltrialkoxysilanes are methyltrimethoxysilane, methyltriethoxysilane, methyltri(1-propoxy)silane, methyltri(2-propoxy)silane, methyltri(2-methyl-2-propoxy)silane, methyltri(1-butoxy)silane, and methyltri(2-butoxy)silane; examples of phenyltrialkoxysilanes are phenyltrimethoxysilane, phenyltriethoxysilane, phenyltri(1-propoxy)silane, phenyltri(2-propoxy)silane, phenyltri(2-methyl - 2 - propoxy)silane, phenyltri(1-butoxy)silane, and phenyltri(2-butoxy)silane.

A further aspect of the invention of the −344 application that provides an especially heat-resistant, machinable, cured organopolysiloxane body comprises heating a mixture which comprises a hydrolyzable methyltrialkoxysilane, a hydrolyzable phenyltrialkoxysilane, and water in a relative molar ratio of $x:y$: at least $1.5(x+y)$, respectively, and advantageously a ratio of $x:y:3(x+y)$, respectively, wherein $x$ and $y$ are independently selected from the range of 1 to 10, inclusive, at a temperature between ambient temperature and 150° C. for a time of 1 to 10 hours; removing 50 to 90 mole percent of the alkanol by-product by volatilization; heating the reaction mixture to effect precure at a temperature within the range of from 5 centigrade degrees up to 110 centigrade degrees above the boiling point of pure water at the prevailing pressure, but usually not above 250° C., for a time up to 30 minutes; casting and then curing the resinous mixture thus obtained for at least one day at a temperature within 10 centigrade degrees below the boiling point of pure water at the prevailing pressure, then at a temperature increasing continually up to a maximum of up to 350° C. over a period of from 2 to 30 days, and finally allowing the sample to return slowly to ambient temperature over a time of from 1 to 12 hours.

A preferred procedure of the invention of the −344 application comprises heating at reflux temperature, for from 2 to 4 hours, a reaction mixture which comprises methyltriethoxysilane, phenyltriethoxysilane, and water in a relative molar ratio of $x:y$: at least $1.5(x+y)$, respectively, and advantageously a ratio of $x:y:3(x+y)$, respectively; in other words, on a molar basis the ratio of water to the sum of $x+y$ is a minimum of 1.5 and advantageously is 3. The values $x$ and $y$ are independently selected from the range of 1 to 5, inclusive. Additional steps in the preferred procedure include distilling 70 to 80 mole percent of 95% ethanol by-product from the reaction mixture, subjecting the distillation residue to a precure at 110° to 200° C. for a time up to 10 minutes at ambient pressure; and finally casting and then curing the resulting resinous mixture at 25° to 95° C. and at about atmospheric pressure for a time of from one day to one week to give a machinable, cured, heat-resistant organopolysiloxane body.

The initial reaction mixture of the procedure of the −344 application optionally contains an acidic catalyst, although the hydrolysis and subsequent condensation normally proceed at a convenient rate without them. To avoid premature gelation of the resins the quantity of acid in the reaction mixture must be below 0.01 mole of acid per mole of hydrolyzable precursor of a silanol. Similarly a solvent, e.g., ethanol, can be added to render the reaction mixture homogeneous.

The initial reaction mixture used in the invention of the −344 application also may contain precursors of methylsilanetriol and phenylsilanetriol in the above-defined ratios and 0 to 10 mole percent, usually 0 to 5 mole percent, of a co-reactant which, when present, usually comprises at least 1 mole percent of the mixture. (The aforementioned mole percentages are based on the hydrolyzable silane components of the initial mixture.) The aforesaid co-reactant comprises at least one compound of the formula VII 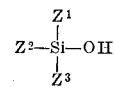

wherein $Z^1$, $Z^2$ and $Z^3$ represent monovalent hydrocarbon radicals independently selected from the group consisting of aryl, alkyl (including cycloalkyl) and alkenyl radicals, each of which contains less than 7 (i.e., 1–6) carbon atoms, and the hydroxyl radical. Examples of such co-reactants are trimethylsilanol, tri(1-methylethyl)silanol, trihexylsilanol, di(1 - methylpropyl) - silanediol, divinylsilanediol, diphenylsilanediol, propylpentylsilanediol, methylallylsilanediol, vinylphenylsilanediol, ethylsilanetriol, 1-methylethylsilanetriol, 1,1-dimethylethylsilanetriol, 2,2-dimethylpropylsilanetriol, hexylsilanetriol, and vinylsilanetriol. These co-reactants can be added to the reaction mixture in the form of their precursors of the formula VIII 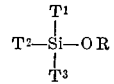

wherein $T^1$, $T^2$ and $T^3$ represent monovalent hydrocarbon radicals independently selected from the group consisting of aryl, alkyl (including cycloalkyl) and alkenyl radicals, each of which contains less than 7 carbon atoms, and the alkoxy radical RO—, wherein R has the meaning previously defined with respect to the formulas for $CH_3Si(OR)_3$ and $C_6H_5Si(OR)_3$. Examples of such precursors are trimethylmethoxysilane, tri(1-methylethyl)ethoxysilane, trihexyl(1,1 - dimethylethoxy)silane, tricyclopentylmethoxysilane, di(1 - methylpropyl)diethoxysilane, divinyldipropoxysilane, diphenyldiethoxysilane, propylpentylmethoxyethoxysilane, methylallyldi(1-methylethoxy)silane, vinylphenyldimethoxysilane, ethyltriethoxysilane, (1-methylethyl)trimethoxysilane, (1,1-dimethylethyl)tripropoxysilane, (2,2 - dimethylpropyl)tributoxysilane, hexyltriethoxysilane, and vinyltriethoxysilane.

A further variation in the procedure of the invention of the –344 application can be achieved by hydrolyzing individually a hydrolyzable methyltrialkoxysilane and a hydrolyzable phenyltrialkoxysilane, and then combining the resulting organopolysiloxanes to form the initial reaction mixture described above. The resulting resinous mixture ultimately yields, by the method described, a cured, solid, machinable, heat-resistant organopolysiloxane body.

Products of the invention of the –344 application and organophosphorus modifications of which can be produced by the instant invention are machinable, heat-resistant bodies comprising or consisting essentially of the siloxane condensation product of methylsilanetriol and phenylsilanetriol, in a molar ratio of from 1:10 to 10:1 (preferably from 1:5 to 5:1), respectively, and into which also may be incorporated, e.g., by co-condensation of the later-named diol with the methylsilanetriol and phenylsilanetriol, from 0 to 10 (preferably from 0 to 5) mole percent of the siloxane condensation product of diphenylsilanediol. In a similar manner organophosporus-modified organopolysiloxanes can be prepared and utilized, prior to curing to completely condensed state, as adhesive compositions for adhesively joining together laminae such as glass and other structural materials hereafter set forth.

It will be understood, of course, by those skilled in the art that the silanols mentioned in the preceding paragraph, as well as the foregoing and others set forth elsewhere in the specification and in the appended claims, need not be preformed in making the siloxane condensation product. The aforementioned silanols therefore include both those which can be preformed (that is, prepared and isolated prior to undergoing a condensation reaction to form an organopolysiloxane) as well as those which are transitory (that is, incapable of being isolated in pure or substantially pure form as such before condensing to form siloxane linkages).

THE ORGANOPHOSPHORUS MODIFIER

As stated in the second paragraph of this specification, the organophosphorus modifier is at least one member of the group consisting of organic tertiary phosphates, organic tertiary phosphites and organic phosphonates. The formulas for these organo phosphorus compounds have been given hereinbefore as Formulas II, III and IV and wherein it has been indicated that R in the formulas for the said compounds is preferably a hydrocarbon radical. Illustrative examples of organic radicals represented by the various R's in the aforementioned formulas, which radicals may be the same or different, are hydrocarbon radicals, especially those which contain less than about 7 carbon atoms. Examples of such radicals are those given hereinbefore with reference to illustrative examples of radicals represented by T in Formula I, and in the broader definition of T in Formula I and illustrative examples thereof appearing in the aforementioned parent application Ser. No. 418,549. In other words, examples of hydrocarbon radicals represented by R in Formulae II, III and IV are alkyl, alkenyl and aryl radicals having less than about 7 carbon atoms, e.g., methyl, ethyl and propyl through hexyl (both normal and isomeric forms), cyclopentyl, cyclohexyl, vinyl and the normal and isomeric forms of propenyl through hexenyl, and phenyl. Preferably R in the —OR groups in the compounds represented by Formulas II, III and IV represents an alkyl radical containing less than 6 carbon atoms and, more preferably, less than 5 carbon atoms, e.g., methyl, ethyl and the normal and isomeric forms of the propyl and butyl radicals.

Any suitable technique may be used in incorporating the organophosphorus compound into the organopolysiloxane. In some instances it may be advantageous to admix the organophosphorus compound with the silanol(s) and/or precursor(s) of silanol(s) prior to hydrolysis (if a precursor or precursors are employed) and condensation to the organopolysiloxane. Or, the phosphorus compound may be added at any time after hydrolysis and simultaneous condensation have been initiated up to the time or point during precure at which the partly cured organopolysiloxane still contains sufficient residual water and/or alcohol by-product to have a solvent action on the organophosphorus compound, thereby permitting ease of admixture and coaction with the incompletely cured or condensed organopolysiloxane. For example, the phosphorus compound may be incorporated into the heat-curable organopolysiloxane while the latter contains at least about 20%, e.g., from 30 to 80 or 90%, by weight of the theoretical amount of volatile by-products of the reaction to form the phosphorus-modified organopolysiloxane. Or, the phosphorus compound may be added to the reaction mass just prior to starting to distill off the volatile by-products. The chosen phosphorus compound and its solubility characteristics are taken into consideration when determining the point of its addition into the organopolysiloxane.

The amount of phosphorus compound incorporated in the organopolysiloxane is sufficient to improve physical properties, especially adhesiveness to a substrate or adhesive bonding to laminae, of the cured organopolysiloxane, that is, of the organopolysiloxane in its ultimate form or state for service use. Although it may vary considerably, the amount of organophosphorus compound advantageously incorporated into the incompletely condensed organopolysiloxane generally corresponds to from about 2 to about 35, preferably from about 5 to about 20 or 25, mole percent of the total molar amount of the starting hydrolyzable silane (and/or silanol if the latter is used).

I am unable to state with certainty the nature of the reaction or association that takes place when an organophosphorus compound of the kind used in practicing this invention is incorporated into an organopolysiloxane as herein set forth. However, to ascertain whether or not there was a valid theoretical foundation for the belief that the organic phosphorus compounds used in practicing this invention at least co-condensed, and probably with certain phosphorus compounds and under certain reaction conditions both co-hydrolyzed and co-condensed, with the hydrolyzable silane and/or silanol starting reactant, the following tests were carried out.

A toluene solution of equal molar proportions of diphenylsilanediol (21.6 g.) and phenylphosphonic acid (15.8 g.) was heated in a 250-ml., 3-necked flask provided with a thermometer, Dean and Stark trap and controlled heating means. The reaction mixture was heated to 90° C. and refluxed at that temperature for 4 hours. After heating for 10 minutes water condensed on the inside of the flask, at which point the pot temperature was about 76° C. and there was indication that a co-condensation reaction was taking place. The by-product water of condensation was collected in the form of a toluene-water azeotrope. The product was a viscous, light-brownish, linear polymer. From the starting reactants and proportions thereof employed, there is valid reason to believe that the polymer contained a

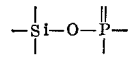

backbone.

In another test a xylene solution of equal molar proportions of diphenyldiethoxysilane (56.85 g.) and phenylphosphonic acid (33.00 g.) was heated and refluxed as described in the previous test. The diphenyldiethoxysilane co-condensed with the phenylphosphonic acid, as evidenced by the collection of ethanol as a by-product of the reaction, yielding a linear polymer in which the backbone is believed to be essentially the same as that of the linear polymer of the previous test.

In another test equal molar proportions of diphenylsilanediol (9.1 g.) and dimethyl methylphosphonate (5.23 g.) were mixed in a round-bottomed flask provided with a thermometer, condenser and stirrer. The flask was then placed in an oil bath preheated to 140° C., wherein it was heated for 4¾ hours. After heating for 10 minutes to a vapor temperature of 70° C., liquid drops formed on the inside of the flask. Heating was then continued for an additional 1 hour and 5 minutes at which time a vacuum pump was used to withdraw the evolved liquid from the reaction flask into a receiving flask. The collected liquid was identified as methanol, indicating that the dimethyl methylphosphonate had co-condensed with the diphenylsilanediol.

After heating for an additional 1½ hours in the 140° C. oil bath, during which period methanol was collected, the reaction mass was subjected to a higher vacuum in an effort to withdraw a maximum amount of by-product methanol and unreacted monomers, and heating in the aforesaid 140° C. bath was continued for another hour under this higher vacuum. The product was a pasty material, light brown in color, and comprised a linear polymer. From the starting reactants and proportions thereof employed, there is valid reason to believe that this linear polymer consisted essentially of recurring units represented by the formula

IX

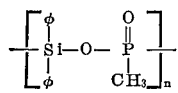

wherein $\phi$ represents a phenyl radical and $n$ represents a number which has an average value of at least 2.

The preferred organopolysiloxanes employed in practicing this invention are those prepared as previously has been described and into which the organophosphorus compound has been incorporated by the above-described technique. Further processing of the organophosphorus-modified, partly cured (i.e., precured) organopolysiloxane is essentially the same as set forth in the aforementioned applications Ser. Nos. 306,344 and 370,684 of Burzynski et al. For instance, modifiers in addition to an organophosphorus compound, and which are substantially chemically inert during the further curing conditions employed, can be added to the organopolysiloxane to obtain desired variations in properties. Fillers, e.g., diatomaceous earth and other forms of silica, as well as clays or clay-like materials, e.g., bentonite, etc., fibers, e.g., glass fibers, organic fibers of natural and synthetic origin, etc., can be added. Coloring agents such as alcohol- or water-soluble dyes or insoluble pigments can be incorporated into the organophosphorus-modified organopolysiloxane to give compositions or bodies of the kind herein described and which are also colored. The quantity of dye or pigment and the most advantageous point of its addition depend upon such influencing variables as, for instance, the particular coloring agent used and the desired color of the product. These variables are, therefore, best determined by routine test.

Illustrative examples of other effect agents that may be incorporated into the organopolysiloxane are opacifiers, e.g., titanium dioxide, zinc oxide, etc., non-reactive plasticizers, mold lubricants, heat-stabilizers, inhibitors of various kinds including decomposition inhibtors, natural and synthetic resins, and other modifiers or additives commonly employed in casting, molding, coating and other compositions.

After casting or otherwise shaping in a mold, or after deposition as a coating on a substrate, or after applying as an adhesive composition in bonding together laminae or other abutting structures, or after other equivalent action, the organophosphorus-modified organopolysiloxane resin is cured. Cross-linking and some linear polymerization probably proceed at this stage since the resin becomes increasingly hard.

Taking as an example the production of a cast resin to obtain a hard, machinable, heat-resistant body, the final cure of such a resin can be carried out, if desired, at room temperature (20°–30° C.) or lower merely by allowing the cast resin to remain undisturbed.

Although the final cure may be effected without added heat, a more convenient procedure involves heating the organophosphorus-modified, precured organopolysiloxane resin at about 90° C. for varying time intervals, e.g., for from about 1 to 3 days, or sometimes longer, for instance up to 9 days. The final stages of cure can also be carried out at temperatures above 100° C. after a cure at 90° C. has brought the resin to a substantially hard condition.

The resinous product of the precure step is soluble in water-miscible organic solvents such as alkanols (e.g., methanol through pentanol), ketones (e.g., acetone, methyl ethyl ketone, etc.), ethers (e.g., glycol monoethyl ether, tetrahydrofuran, etc.), as well as many other common organic solvents. The resulting solutions have prolonged storage life before gelation occurs, and their stability increases with decreasing temperature and resin concentration.

A lower limit for resin concentration is set only by convenience, since storage and subsequent removal of solvent from extremely dilute solutions is generally commercially unfavorable. These dilute solutions, usually containing about 50 weight percent of resin solids, can be evaporated to a more viscous stage and used as molding materials by the further curing steps already described. As previously indicated, they can also be used as film-forming materials, e.g., in coating applications, by spraying, brushing, or other means known to the art. The thickness of the resulting films can be controlled, of course, by varying the concentration of the resin solution and the number of layers applied. The coatings thereby obtained can be cured by heating, e.g., according to the curing process previously described for making a molded resin.

The above-described techniques for the preparation of solid, organopolysiloxane bodies are, in general, also applicable to the formation of such films. The final, cured products are substantially solid and apparently possess a high degree of cross-linking, since they are substantially insoluble in solvents such as benzene and toluene.

As indicated hereinbefore, a particularly valuable embodiment of the present invention is the porduction of products or articles comprising laminae or abutting materials or joints bonded together with an adhesive composition or binder comprising or consisting essentially of an organophosphorus-modified organopolysiloxane of the kind with which this invention is concerned. The articles comprised of laminae bonded together with a laminating composition comprising a modified organopolysiloxane of this invention include those wherein two or more of the laminae are constituted of the same or different materials. Particularly good results are obtained when at least one of the adjacent members that are laminated together is constituted of glass, more particularly sheet or flat glass. The surprising and unobvious nature of this use of the organophosphorus-modified organopolysiloxanes of this invention is shown by the fact that, whereas two pieces of sheet glass were not rigidly bonded together by an unmodified organopolysiloxane in cured state, two pieces of the same kind of sheet glass were rigidly bonded together by a cured organophosphorus-modified organopolysiloxane. With the exception of the incorporation of an organophosphorus compound into the organopolysiloxane, the modified and unmodified organopolysiloxanes that were subjected to this comparative test for bonding properties were otherwise essentially the same in their chemical constitution.

Illustrative examples of other materials that may be bonded together with the modified organopolysiloxanes of this invention are metals, e.g., aluminum and its alloys, copper and its alloys, ferrous metals such as iron and its alloys including ordinary steel, stainless steel, tin- and chromium-coated steels, magnesium and its alloys, and the like, in sheet, cast or other form. Glass in sheet, fibrous or other form and metals, such as those mentioned above, may be alternated, if desired, and bonded together with the organophosphorus-modified organopolysiloxane to form a composite article or laminated product of any desired shape or form.

If desired, two or more of the laminae may be constituted of the same or different materials such as, for example, fabrics or sheets of fibrous materials including cotton, linen, wool, silk and other natural fibrous materials; of synthetic or artificial filamentary materials (both organic and inorganic) such as viscose and cuprammonium rayons, cellulose esters, e.g., cellulose acetate (including cellulose triacetate), cellulose butyrate, cellulose acetobutyrate, etc., nylons, polyesters, acrylics (i.e., polyacrylonitriles), so-called modacrylics, polyimides, polyimidazoles, polyquinazolines, etc.; and such materials as paper, paperboard, solid high-melting (or unmeltable) natural and synthetic, thermoplastic and thermosetting resins, as well as the aforementioned glass and metals in sheet, fibrous or other form. Ceramic materials and glass-ceramic materials are examples of still other materials or structures that may be laminated or joined together with an organophosphorus-modified organopolysiloxane of this invention to provide composite articles or laminated products in which the elements or laminae thereof are rigidly united together in a firm, strong bond.

It will be understood, of course, by those skilled in the art that the particular materials or bodies that are to be laminated or joined together and the temperature and time of curing the bonding agent in situ are correlated so that the curing temperature and time will not adversely affect the useful properties of the laminae or bodies that are being adhesively joined together.

In order that those skilled in the art may better understand how the present invention can be carried into effect, the following examples are given by way of illustration and not by way of limitation. All parts and percentages are by weight unless otherwise stated.

EXAMPLE 1

This example illustrates the modification of an organopolysiloxane with an organic phosphonate, specifically dimethyl methylphosphonate (DMMP), the formula for which is

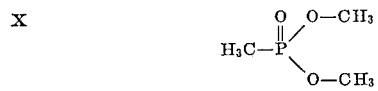

The organopolysiloxane is derived from purified methyltriethoxysilane (MTS) and purified phenyltriethoxysilane (PTS). In individual runs the molar amount of DMMP is varied from 3.33 mole percent to 33.33 mole percent of the total molar amount of hydrolyzable silane reactants ($MTS+PTS$). The reactants and proportions thereof employed are as follows:

| Reactants | Wt. used, g. | Moles used | Molar ratio |
|---|---|---|---|
| MTS | 89 | 0.50 | 2 |
| PTS | 57 | ca. 0.25 | 1 |
| H$_2$O | 41 | 2.25 | 9 |
| DMMP | 3.1–31.0 | 0.025–0.25 | 0.10–1.0 |

More particularly it may be stated that the moles of DMMP used in individual runs is as follows: 0.025, 0.05, 0.10, 0.20 and 0.25. The procedure is as follows:

The first three reactants are heated together with stirring in a 250 ml., 3-necked, round-bottomed flask to about 80° C. (The flask is equipped with a thermometer, a magnetic stirrer and a condenser that is provided with a take-off to allow reflux or distillation.) Usually after about 5 or 10 minutes at this temperature a one-phase system is formed. Thereafter the reaction mass is heated under reflux for about 4 hours at 80° C. At the end of the first hour of reflux the DMMP (e.g., 6.2 g.; 0.05 mole) is added to the reaction mass, whereupon the reaction mixture first turns cloudy and then clears. After refluxing for about 4 hours, the equipment is arranged for distillation and about 80% (90 ml.) of the by-product ethanol is distilled off.

The residual organopolysiloxane is precured by heating to 140° C. with stirring, e.g., over a period of 20 minutes. The resulting viscous resin is cast into discs by pouring samples into an aluminum foil mold, 2 inches in diameter and about ¾ inch deep. The cast resin is then cured by heating in a 90° C. oven for from 1 to 9 days, yielding a hard, transparent resin that has improved resistance to thermal shock when subjected to an elevated temperature.

The precured polymer is also particularly useful as an adhesive or laminating composition to join the same or different materials to be bonded together, e.g., glass-to-glass, glass-to-metal, wood-to-wood, metal-to-metal, wood-to-metal, glass-to-wood, and the like. The precured polymer is also useful as a coating composition or as a component of such compositions. Surfaces coated with the precured polymer and then cured in situ possess good adhesiveness of the coating, clarity and resistance to thermal shock.

EXAMPLE 2

Same as in Example 1 with the exception that the reactants and proportions thereof employed are as follows:

| Reactants | Wt. used, g. | Moles used |
|---|---|---|
| MTS | 132 | 0.75 |
| DMMP | 3.1–24.8 | 0.025–0.2 |
| H$_2$O | 41 | 2.25 |

About 10 to 15 minutes' heating at 80° C. is usually necessary before the mixture of MTS and water clears to a one-phase system. As in Example 1, the DMMP is added after refluxing for one hour. During the 3-hour period of additional refluxing the DMMP co-condenses (or co-hydrolyzes and co-condenses) with the hydrolyzed MTS, just as it co-condenses with the hydrolyzed mixture of MTS and PTS in forming the modified organopolysiloxane of Example 1.

The prepolymers are useful in making molded castings, and as adhesive, laminating and coating compositions having outstanding bond strengths.

EXAMPLE 3

Same as in Example 1 with the exception that the reactants and proportions thereof are as follows:

| Reactants | Wt. used, g. | Moles used |
|---|---|---|
| PTS | 114 | ca. 0.5 |
| H$_2$O | 27 | 1.5 |
| DMMP | 6.2 | 0.05 |

The prepolymer can be used directly, if desired, as a coating for laminating composition; or the precured viscous resin can be cast into molds and cured to a hard, heat-resistant resin, or used as an adhesive, laminating or coating material.

EXAMPLE 4

This examples illustrates the results of comparative tests between an unmodified (methyl)(phenyl)polysiloxane and a (methyl)(phenyl)polysiloxane that has been modified with dimethyl methylphosphonate (DMMP).

(A) The unmodified or "control" organopolysiloxane is prepared from the following reactants in the specified amounts and molar ratios:

| Reactants | Amount used, ml. | Molar ratio |
|---|---|---|
| MTS | 400 | 2 |
| PTS | 240 | 1 |
| H$_2$O | 162 | 9 |

(B) In making the modified organopolysiloxane the reactants, amounts and molar ratios employed are exactly the same as in the (A) portion of this example with the exception that there is additionally included 21.2 ml. of DMMP which provides a molar ratio of 0.2 with respect to the other reactants.

Both the (A) and (B) reaction mixtures are brought to an initial total acidity, calculated as HCl, of 5 p.p.m. by the addition of 20 drops of 0.1 N HCl.

The general procedure is much the same as described under Example 1. The reaction mixture is heated with stirring over a period of 30 minutes to reflux temperature (80° C.). After refluxing for an additional 5 minutes, a clear one-phase system is obtained. The DMMP is added after refluxing for another 30 minutes. Slight yellowing of the reaction mass is noted after refluxing for 15 minutes following the addition of the DMMP. Refluxing is discontinued 4 hours after initial heating was started, and the apparatus is changed to permit the distillation of by-product ethanol of which 200 ml. (about 80% of the theoretical) is collected.

The residual organopolysiloxanes of (A) and (B) are precured by heating with stirring to 140° C. The precured samples are then cast into small circular aluminum pans wherein molded discs (2 in. diameter x ¼ or ½ in. thick) are formed when the resin is fully cured. Curing is effected by placing the cast samples in a 90° C. oven until the resin has solidified. The aluminum mold is then stripped from the cast resin, and the latter is cured in the aforesaid 90° C. oven for a total of 3½ days with one side upward so that it is fully exposed to the hot, circulating air. The individual discs are then inverted so that the former underside is now upward, and oven curing at 90° C. is continued for an additional 5½ days.

The plasticizing effect of the organophosphorus compound on the organopolysiloxane is shown by the following results of hardness tests on the molded test specimens of (A) and (B):

|  | Hardness (Alpha-Rockwell) | |
| --- | --- | --- |
|  | Outside | Inside |
| (A) Unmodified (control) | 147 | 162 |
| (B) Modified | 149 | 175 |

The higher values for the modified organopolysiloxane of (B) show that both its outside and its inside or middle surfaces are softer (i.e., less hard) than the control, the differences being more pronounced on the inside surfaces.

The improved thermal shock resistance is shown by the fact that the control discs (two specimens) cracked after exposure to a much lower temperature (followed by cooling in air) than the modified organopolysiloxane of (B). Specifically, one control disc cracked after being heated to only 150° C. and the other after being heated to 175° C. In marked contrast, both test specimens of (B) cracked only after having been heated to 225° C. followed by cooling in air. In both cases the degree of cracking was from slight to moderate.

When discs of the (A) (control) and (B) (modified) organopolysiloxanes were tested for their resistance to prolonged thermal exposure at 250° C., a test specimen of (B) showed no cracking whatsoever after being heated for one hour at this temperature, whereas a control disc of (A) cracked severely when subjected to this same test.

A description of the test procedure is given after Example 5.

EXAMPLE 5

This example illustrates the results of comparative tests between an unmodified methylpolysiloxane and a methylpolysiloxane that has been modified with DMMP.

(A) The unmodified or "control" organopolysiloxane is prepared from the following reactants in the specified amounts and molar ratios:

| Reactants | Amount Used, ml. | Molar Ratio |
| --- | --- | --- |
| MTS | 700 | 3.5 |
| $H_2O$ | 18 | 8.75 |

It will be noted that th eabove proportions are such that the molar ratio of MTS:$H_2O$ is 1:2.5.

(B) The reactants, amounts and molar ratios employed in making the modified organopolysiloxane are exactly the same as in the (A) portion of this example with the exception that there is additionally included 26 ml. of DMMP which provides a molar ratio of 0.2 with respect to the other reactants.

Both the (A) and (B) reaction mixtures are brought to an initial total acidity, calculated as HCl, of 3 p.p.m. by the addition of 14 drops of 0.1 N HCl.

The procedure for making the unmodified and modified organopolysiloxanes of (A) and (B), and of precuring and curing the incompletely cured resins, is the same as described in Example 4.

The plasticizing effect of the organophosphorus compound on the organopolysiloxane is shown by the following results of hardness tests on the molded test specimens of (A) and (B):

|  | Hardness (Alpha-Rockwell) | |
| --- | --- | --- |
|  | Outside | Inside |
| (A) Unmodified (control) | 176 | 196 |
| (B) Modified | >200 | >200 |

When tested for thermal shock resistance the control specimens (2) cracked after being heated to only 150° C. followed by cooling in air, the degree of cracking being from slight to moderate. In marked contrast two test specimens of (B), when subjected to the same test, cracked only after being heated to 200° C. followed by cooling in air, and the degree of cracking was very slight.

When discs of the (A) (control) and (B) (modified) organopolysiloxanes were tested for their resistance to prolonged thermal exposure at 250° C., the control specimens (2) cracked severely after being heated for 1 hour at 250° C. Surprisingly and unobviously, one test specimen of a molded disc of (B) did not crack until after it had been heated for 5 hours at 250° C., while another test specimen of (B) cracked only after it had been heated for a period between 8 and 72 hours at 250° C.

TESTS METHODS

The tests for alpha-Rockwell hardness, thermal shock resistance and resistance to prolonged thermal exposure are carried out as follows:

Rockwell hardness.—This test involves the dead-weight loading of a steel ball on the surface of the test material. The depth of penetration of the ball is an indication of the hardness of the material (but not its abrasive resistance); hence the lower the recorded values, the harder is the material undergoing the test. The apparatus is a Rockwell hardness tester described in ASTM–D–785. Molded discs, 2 inch diameter x ½ inch thick, are employed for this test. A strip, ½ inch x ½ inch x 2 inches is cut from the center of the disc for use in measuring the hardness of the internal and molded surface material.

The testing method employed is in accordance with Procedure B of ASTM–D–785. Two measurements are made on one molded surface, after which the sample is turned over, and two measurements are taken on the opposite molded surface. Two measurements are taken on only one face of the internal section. Thus, a total of six measurements are made per specimen. The hardness determined by this procedure is known as the alpha-Rockwell hardness. The values reported in the tables are the averages of the recorded readings of the specimens tested from the individual runs.

Thermal shock resistance.—This test provides an indication of the effect of temperature changes upon a material. In carrying out the test specimens are gradually heated up to the test temperature and then removed to room temperature and allowed to cool in air. Samples will usually fail more easily on cooling because tensile stresses are produced on the surface of the sample. Observations are made as to presence of cracks forming upon cooling. Thermal shock is generally encountered during rapid heating or cooling in brittle materials that exhibit large coefficients of thermal expansion.

As the test specimens, of which two are normally employed per test, one may use one-fourth of an Izod impact specimen (broken) or one-fourth of a 2 inch diameter x ¼ inch thick disc. The procedure is as follows:

Place two specimens in an electric muffle furnace at 150° C. (The furnace employed is one that is provided with controls so that the furnace temperature can be increased by increments of 25° C.) After the specimens have been maintained at 150° C. for 15 minutes, remove them one at a time using tongs and place them (bottom of casting down) upon a Transite plaque at room temperature (20°–30° C.) to cool. When the specimens have reached approximately room temperature for 15 minutes, observe them for the presence of cracks. If there are no cracks present, place them back into the furnace and change the setting to produce a temperature of 175° C. Repeat steps for removing and observing specimens. Continue to test specimens at 25° C. increments until failure occurs. If the specimens fail on the heat-up, a slower rate of heating may be required. If specimens should discolor or produce other unusual effects before failing, note them. Temperatures should be checked with a thermometer as well as with the furnace controller.

Resistance to prolonged thermal exposure.—This property, also known as thermal resistance or as thermofailure, determines the length of time a material will withstand a particular temperature (e.g., 250° C. or higher). The property is important because many non-stabilized materials (especially those which are wholly or partly organic) become discolored, may craze or even crack if maintained at an elevated temperature for a period of time.

The main apparatus or facilities employed are an electric muffle furnace or oven capable of raising the temperature gradually (e.g., at about 50° C. per hour) to the desired maximum; and a strong light source for observing the specimens while they are in the oven. Two test specimens, which are one-fourth sections of the aforementioned 2 inch diameter discs, and a control, are placed in the oven, and the temperature is raised at about 50° to 60° C. per hour. Temperatures are checked with a thermometer as well as with the oven controller. The specimens are observed every hour for the first 4 hours until discoloration or cracking occurs. The yellow color that normally develops at the elevated temperature is always compared with the control. The test is normally discontinued after 24 hours. Cracking is taken as evidence of thermofailure, and the temperature at which this occurs is recorded.

EXAMPLE 6

This example illustrates the preparation of a specific resin of the kind described under Example 1 and its use as an adhesive in joining sheet glass to sheet glass.

| Reactants | Wt. used, g. | Moles used | Molar ratio |
|---|---|---|---|
| MTS | 178 | 1.0 | 2 |
| PTS | 120 | 0.5 | 1 |
| H₂O | 81 | 4.5 | 9 |
| DMMP | 12.4 | 0.1 | 0.2 |

A 500 ml., 3-necked flask equipped in the same manner as that employed in Example 1 is used. The reaction mixture is adjusted to an acidity of 5 p.p.m., calculated as HCl, by the addition of two drops of 1 N HCl. The reaction mass is brought to a reflux temperature of 80° C. after heating for about 22 minutes. After heating for an additional 8 minutes the initial two-phase system clears to a single phase. After refluxing for 1 hour the dimethyl methylphosphonate is added. Refluxing is then continued for 3 more hours at the end of which period the apparatus is changed to distill off and collect the by-product ethanol. About 80% of the theoretical amount of ethanol is collected.

A portion of the residual organophosphorus-modified organopolysiloxane is precured by heating to 140° C. The precured resin is used as an adhesive in bonding glass to glass. The test specimens of glass are commercially available, pre-cleaned microscope slides, about 75 mm. long, about 38 mm. wide and about 1 mm. thick. These are used without further treatment of any kind. The adhesion area that is coated with the precured resin is about ¾ square inch. The glass slides are lap-jointed in the adhesion area under moderate pressure, and then heated in a 70° C. oven for 2 days and in a 90° C. oven for 6 days in order to cure the resin joining the slides together to a solid state.

The adhesive tests on the bonded glass slides are carried out on an apparatus capable of measuring the load applied on the sample under test. The test for shear strength is a modification of ASTM Method D1002–53T in that it is used in testing glass-to-glass bonds instead of metal-to-metal bonds as specified in the aforementioned ASTM procedure. The results of the shear test are given below:

| Sample | Adhesion area | | | Max. load (lbs.) | Stress (lbs./sq. in.) | Type of failure |
|---|---|---|---|---|---|---|
| | Lap (in.) | Width (in.) | Sq. in. | | | |
| 1 | 0.469 | 1.50 | 0.703 | 204 | 290 | Complete shear. |
| 2 | 0.484 | 1.50 | 0.726 | 280 | 385 | Glass. |
| 3 | 0.484 | 1.50 | 0.726 | 235 | 323 | Do. |
| 4 | 0.500 | 1.50 | 0.750 | 220 | 293 | Do. |
| Average | | | | 235 | 323 | |

In a manner similar to that described above bonds are made between other sheet materials or laminae, e.g., steel-to-glass; aluminum-to-glass; steel-to-steel; aluminum-to-steel; aluminum-to-aluminum; etc. Such metal samples do sanded, e.g., with coarse emery cloth, to give a bright surface and are then wiped with a tissue soaked in a suitable solvent, e.g., CCl₄, prior to forming bonds utilizing the organophosphorus-modified organopolysiloxane.

EXAMPLE 7

This example illustrates the use of trimethyl phosphate as a modifier in producing a phosphorus modified organopolysiloxane.

| Reactants | Wt. used, g. | Moles used | Molar ratio |
|---|---|---|---|
| MTS | 89 | 0.50 | 2 |
| PTS | 57 | ca. 0.25 | ca. 1 |
| H₂O | 41 | 2.25 | 9 |
| Trimethyl phosphate | 7 | 0.05 | 0.2 |

The procedure is essentially the same as that described in Example 6 which, in turn, refers to Example 1.

A portion of the residual, modified organopolysiloxane is precured to 140° C. and used in bonding together two sets of glass slides as set forth in Example 6. Qualitative tests indicate that the shear strengths are at least equal to, if not better than, the shear strengths of the bonded glass slides of Example 6.

Another portion of the 140° C. precured resin is used to coat clean surfaces of metals including aluminum and steel. The coatings on the metals are cured by heating for 2 days at 70° C. and then for 6 days at 90° C. The cured coatings are water-repellent, durable and adhere strongly to the metal substrate. The stability of the cured polymer to hydrolysis is shown by the fact that there is no evidence of any change in it when a piece of metal coated with the modified organopolysiloxane is placed in boiling water for 6 hours.

EXAMPLE 8

Same as in Example 7 with the exception that 9.1 g.

(0.05 mole) of triethyl phosphate is used instead of trimethyl phosphate. Similar results are obtained.

EXAMPLE 9

Same as in Example 7 with the exception that, in individual runs, the following organic tertiary phosphites are employed (0.05 mole in each case) instead of trimethyl phosphate:

(A) Trimethyl phosphite
(B) Triethyl phosphite
(C) Tri-$n$-propyl phosphite.

Substantially the same results are obtained.

EXAMPLE 10

Example 2 is repeated with the exception that instead of ¾ mole methyltriethoxysilane (MTS) there is used ¾ mole of methyltriisopropoxysilane, and the amount of dimethyl methylphosphonate (DMMP) employed is 0.05 mole. Similar results are obtained.

It is not essential that the phosphorus component be introduced into the organopolysiloxane as a monomer. For instance, it may be introduced as a low-molecular-weight polymer, e.g., as a low-molecular-weight polyphosphonate represented by the general formula

XI $$\left[\begin{array}{c} \text{O} \\ \parallel \\ -\text{P}-\text{O}-\text{R}'-\text{O}- \\ | \\ \text{R} \end{array}\right]_n \text{H}$$

where R represents a monovalent hydrocarbon radical, R' represents a divalent hydrocarbon radical and $n$ represents a number having an average value of from 2 to about 6. Preferably R represents a monovalent hydrocarbon radical having less than 7 carbon atoms and R' represents a divalent hydrocarbon radical having less than 7 carbon atoms. Examples of such preferred radicals represented by R are the phenyl radical and the lower alkyl radicals, more particularly methyl, ethyl and propyl through hexyl (both normal and isomeric forms) radicals. Illustrative examples of divalent radicals represented by R' are the phenylene radical, the ethylene radical, and normal and isomeric propylene through hexylene radicals.

A specific example of such a polymer is shown in Formula XI. It can be prepared, for instance, by reacting one mole of XII 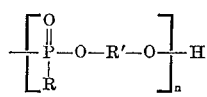

or

XIII 

with from one to two moles of hydroquinone, using a catalyst (e.g., Na) if the latter organophosphorus compound is used as a starting reactant.

Example 11, which follows, shows the utilization of such a low-molecular-weight polyphosphonate in modifying an organopolysiloxane.

EXAMPLE 11

The linear phosphorus-containing polyphosphonate used in this example is one that may be represented by the formula XIV 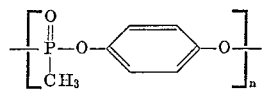

wherein $n$ represents a number having an average value of about 4 or 5.

The reactants and proportions thereof are as follows:

| Reactants | Wt. used, g. | Moles used |
|---|---|---|
| MTS | 132 | 0.75 |
| H₂O | 41 | 2.25 |
| Linear polyphosphonate | 1.7 | About 0.01 |

Essentially the same procedure is followed as described in Example 2 which refers back to Example 1 for a more detailed description. Like the products of Example 2, the phosphorus containing organopolysiloxane prepolymer of this example is useful in making cast moldings, and as adhesive, laminating and coating compositions having outstanding bond strengths, particularly when applied to glass surfaces such as sheet glass, and cured in situ.

Where good color in the organophosphorus-modified organopolysiloxane is important both at normal temperature conditions and after being subjected to an elevated temperature for a prolonged period of time, it is preferred to use organic tertiary phosphates or organic phosphonates wherein the double-bonded atom attached directly to the phosphorus atom is an oxygen atom as also are the other double-bonded atoms in the molecules of the aforementioned phosphorus compounds and in the organic tertiary phosphites (e.g., in the —OR groupings). However, if yellowing or other discoloration of the cured, modified organopolysiloxane is unimportant then, if desired, one may use organic tertiary thiophosphates, organic tertiary thiophosphites or organic thiophosphonates; that is, phosphates, phosphites and phosphonates wherein any or all of the oxygen atoms in organic tertiary phosphates, organic tertiary phosphites and organic phosphonates (as well as in the subclasses of phosphorus-containing compounds embraced by Formulas II, III and IV) are replaced by sulfur atoms. The use of such thiophosphorus compounds is illustrated by Examples 12 and 13.

EXAMPLE 12

This example illustrates the use of diethyl ethylthiophosphonate, the formula for which is XV 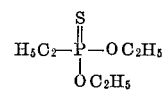

in modifying an organopolysiloxane.

The general procedure is the same as described in Example 1. The reactants and proportions thereof are as follows:

| Reactants | Wt. used, g. | Moles used |
|---|---|---|
| PTS | 60 | 0.25 |
| MTS | 95 | 0.50 |
| H₂O | 41 | 2.25 |
| Thiophosphorus compound | 8.3 | 0.05 |

The precured polymer is particularly useful as an adhesive composition, e.g., in forming a laminate wherein sheet glass comprises at least one of the laminae or body to which the adhesive is applied, such as in making glass-to-glass seals, joints, laminates, etc.

EXAMPLE 13

This example illustrates the use of triethyl thiophosphate, the formula for which is XVI 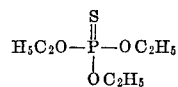

in modifying an organopolysiloxane.

The procedure is essentially the same as given in Example 1. The reactants and proportions thereof are as follows:

| Reactants | Wt. Used, g. | Moles Used |
|---|---|---|
| PTS | 60 | 0.25 |
| MTS | 45 | 0.50 |
| H₂O | 41 | 2.25 |
| Triethyl thiophosphate | 12 | 0.06 |

Cast moldings are made from the modified organopolysiloxane as described in Example 1. A comparison of the cured, solid moldings with cast moldings of unmodified organopolysiloxane that had been cured to solid state shows that the introduction of the triethyl thiophosphate into the organopolysiloxane decreases the brittleness of the cured, solid resin.

As will be apparent to those skilled in the art, modifications of the present invention can be made or followed in the light of the foregoing disclosure without departing from the spirit and scope of the disclosure or from the scope of the claims.

What is claimed is:

1. The method of preparing an organophosphorus-modified organopolysiloxane which comprises:
   (I) preparing an organopolysiloxane by the steps of
      (A) heating a mixture of
         (1) hydrolyzable alkoxysilane material selected from the group consisting of
            (a) a methyltrialkoxysilane having the general formula $CH_3Si(OR)_3$ wherein R in each —OR grouping represents an alkyl radical having less than five carbon atoms, and
            (b) a mixture of methyltrialkoxysilane as defined in (a) and a phenyltrialkoxysilane having the general formula $C_6H_5Si(OR)_3$ wherein R in each —OR group also represents an alkyl radical having less than five carbon atoms, the ratio of the moles of methyltrialkoxysilane and phenyltrialkoxysilane being from 1:10 to 10:1, the alkoxysilane material of (a) and of (b) individually optionally including from 0 to 10 mole percent, based on total silane reactant material, of at least one compound different from the aforementioned methyltrialkoxysilane and phenyltrialkoxysilane and which is represented by the general formula

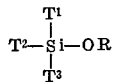

wherein $T^1$, $T^2$ and $T^3$ represent monovalent hydrocarbon radicals independently selected from the group consisting of aryl, alkyl and alkenyl radicals, each of which contains less than seven carbon atoms, and the alkoxy radical, —OR, wherein R in each —OR grouping represents an alkyl radical having less than five carbon atoms, and
         (2) from 1.5 to 10 moles of water per mole of total silane reactant material, said mixture containing less than 0.01 mole of acid per mole of total silane reactant material, and the heating of the said mixture to form a liquid siloxane partial condensation product being for from 1 to 10 hours at a temperature of at least 50° C. while retaining therein at least 1.5 moles of alkanol by-products per mole of total silane starting material;
      (B) concentrating the liquid siloxane partial condensation product from step (A) by volatilizing therefrom between 50 and 90 mole percent of the total by-product alkanol contained therein, as well as some water, thereby to obtain a liquid residue of siloxane partial condensation product; and
      (C) precuring the concentrated liquid siloxane partial condensation product from step (B) by heating it up to 300° C. for a period short of gel formation thereby to remove most of the remainder of the volatile material from the said siloxane partial condensation product and to obtain a more highly condensed, further-curable, siloxane partial condensation product that is adapted to be converted to a solid, thermoset, organopolysiloxane resin; and
   (II) modifying the organopolysiloxane prepared as described under (I) by incorporating therein, during any of steps (A), (B), or (C) of main step (I), at least one phosphorus-containing material which is any of the following:
      (a') organic tertiary phosphate,
      (b') organic tertiary phosphite,
      (c') organic phosphonate,
      (d') low-molecular-weight polymer of (a'), (b') or (c'),
   the amount of the aforesaid phosphorus-containing material being from 2 to about 35 mole percent of the total molar amount of the starting silane reactant material.

2. The method as in claim 1 wherein the organic phosphorus-containing material is incorporated into the organopolysiloxane while the latter contains at least about 20% by weight of the theoretical amount of volatile by-products of the reaction.

3. The method as in claim 2 wherein the organic phosphorus-containing material is at least one organic tertiary phosphate represented by the general formula

wherein R represents a hydrocarbon radical, said phosphate constituting from about 5 to about 25 mole percent of the total molar amount of the starting silane reactant material.

4. The method as in claim 2 wherein the organic phosphorous-containing material is at least one organic tertiary phosphite represented by the general formula

wherein R represents a hydrocarbon radical, said phosphite constituting from about 5 to about 25 mole percent of the total molar amount of the starting silane reactant material.

5. The method as in claim 2 wherein the organic phosphorous-containing material is at least one organic phosphonate represented by the general formula

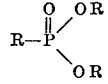

wherein R represents a hydrocarbon radical, said phosphonate constituting from about 5 to about 25 mole percent of the total molar amount of the starting silane reactant material.

6. The method as in claim 2 wherein the organic phosphorous-containing material is at least one low-molecular-weight polyphosphonate in an amount corresponding to from about 5 to about 25 mole percent of the total molar amount of the starting silane reactant material.

7. The method as in claim 6 wherein the polyphosphonate is one represented by the general formula

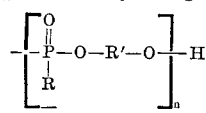

wherein R represents a monovalent hydrocarbon radical, R' represents a divalent hydrocarbon radical, and n represents a number having an average value of from 2 to about 6.

8. The method as in claim 1 wherein the mixture of (A) which is heated contains from 1.5 to about 5 moles of water per mole of total silane reactant material.

9. The method as in claim 1 wherein the mixture of (A) which is heated contains from 1.5 to about 3 moles of water per mole of total silane reactant material; the —OR groupings in the formulae $CH_3Si(OR)_3$ and $C_6H_5Si(OR)_3$ are —$OC_2H_5$ groupings; and the modifying phosphorus-containing material employed in step (II) constitutes from about 5 to about 35 mole percent of the total molar amount of the starting silane reactant material.

10. A composition comprising the precured, further-curable, organophosphorus-modified, siloxane partial condensation product resulting from the method of claim 1.

11. A composition comprising the precured, further-curable, organic tertiary phosphate-modified, siloxane partial condensation product resulting from the method of claim 3.

12. A composition as in claim 11 wherein the modified siloxane partial condensation product is a tris(lower alkyl) phosphate-modified siloxane partial condensation product.

13. A composition comprising the precured, further-curable, organic tertiary phosphite-modified, siloxane partial condensation product resulting from the method of claim 4.

14. A composition comprising the precured, further-curable, organic phosphonate-modified, siloxane partial condensation product resulting from the method of claim 5.

15. A composition comprising the precured, further-curable, polyphosphonate-modified, siloxane partial condensation product resulting from the method of claim 6.

16. The method as in claim 1 which includes the additional step of finally curing the precured, organophosphorus-modified, further-curable, siloxane partial condensation product of (C) by subjecting it to a temperature up to 350° C. for a period sufficient to convert the said precured siloxane partial condensation product to a thermoset, organophosphorus-modified organopolysiloxane.

17. A product comprising the thermoset, organophosphorus-modified organosiloxane resulting from the method of claim 16.

18. A product as in claim 17 that is a laminated product wherein the individual layers of superimposed sheet material are adhesively bonded together with the thermoset, organophosphorus-modified organopolysiloxane resulting from finally curing in situ the organophosphorus-modified, further-curable, siloxane partial condensation product as is specified in claim 17.

19. A laminated product as in claim 18 wherein at least one of the layers of superimposed sheet material is inorganic sheet material.

20. A laminated product as in claim 19 wherein at least one of the layers of inorganic sheet material is glass.

References Cited
UNITED STATES PATENTS 2,502,286   3/1950   Sowa _____ 260—46.5

DONALD E. CZAJA, *Primary Examiner.*

M. I. MARQUIS, *Assistant Examiner.*